(12) United States Patent
Iwashita et al.

(10) Patent No.: US 8,190,287 B2
(45) Date of Patent: May 29, 2012

(54) TOOL VECTOR DISPLAY APPARATUS FOR A MACHINE TOOL WITH ROTATIONAL AXES

(75) Inventors: Yasusuke Iwashita, Yamanashi (JP); Tadashi Okita, Yamanashi (JP); Junichi Tezuka, Yamanashi (JP); Kazuyuki Sugiyama, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 191 days.

(21) Appl. No.: 12/793,337

(22) Filed: Jun. 3, 2010

(65) Prior Publication Data
US 2011/0046773 A1 Feb. 24, 2011

(30) Foreign Application Priority Data
Aug. 19, 2009 (JP) ................. 2009-189818

(51) Int. Cl.
*G06F 19/00* (2011.01)
*G05B 11/01* (2006.01)
*G05B 23/02* (2006.01)
*G05B 19/25* (2006.01)

(52) U.S. Cl. ........ 700/182; 700/184; 700/192; 318/565; 318/568.24; 318/568.25; 318/570; 345/423; 345/426; 345/441; 345/442

(58) Field of Classification Search .................. None
See application file for complete search history.

(56) References Cited

U.S. PATENT DOCUMENTS

| | | | | |
|---|---|---|---|---|
| 5,396,160 A | * | 3/1995 | Chen | 318/573 |
| 5,835,693 A | * | 11/1998 | Lynch et al. | 345/473 |
| 5,995,109 A | * | 11/1999 | Goel et al. | 345/423 |
| 6,704,611 B2 | * | 3/2004 | Coleman et al. | 700/186 |
| 6,853,881 B2 | * | 2/2005 | Watanabe et al. | 700/264 |
| 7,853,351 B2 | * | 12/2010 | Corey | 700/193 |
| 8,010,302 B2 | * | 8/2011 | Okita et al. | 702/41 |
| 8,018,192 B2 | * | 9/2011 | Iwashita et al. | 318/569 |
| 2002/0002420 A1 | | 1/2002 | Hirai et al. | |

FOREIGN PATENT DOCUMENTS

| | | |
|---|---|---|
| JP | 07-72914 A | 3/1995 |
| JP | 9 062 328 A | 3/1997 |
| JP | 962328 A | 3/1997 |
| WO | 97/27521 A1 | 7/1997 |

OTHER PUBLICATIONS

K. Nakamoto et al; "A New Architecture of Tool Path Generation for Five-axis Control Machining"; Key Engineering Materials vols. 291-292 (2005) pp. 501-506.
Examination Report for DE 10 2010 036 499.1 mailed Oct. 28, 2011.
Notification of Reasons for Refusal for Japanese Application No. 2009-189818, mailed Oct. 19, 2010.

* cited by examiner

*Primary Examiner* — Albert Decady
*Assistant Examiner* — Sunray Chang
(74) *Attorney, Agent, or Firm* — Lowe Hauptman Ham & Berner LLP (57) ABSTRACT

Time information t and positional information about each axis are obtained, and the three-dimensional coordinates of tool center point Pe at time t are calculated to display the path of the tool center point Pe at time t. Then, whether a fixed time has elapsed or not is decided. If the fixed time has elapsed, the coordinates of the tool vector start point Ps at time t are calculated to display a line segment connecting between tool vector start point Ps and tool center point Pe, which is the end point of the tool vector. This display enables the orientation of the tool at each tool center point to be grasped at a glance.

6 Claims, 8 Drawing Sheets

FIG.1A  FIG.1B

THE CENTRAL POINTS AT THESE TOOL CENTERS ARE THE SAME.

FIG.2A

THE TOOL MOVES IN THIS DIRECTION.

FIG.2B

WHEN THE TOOL VECTOR INCLINES, THE CUT SURFACE IS AFFECTED.

TOOL CENTER POINT PATH

TOOL VECTOR DISPLAY APPARATUS FOR A MACHINE TOOL WITH ROTATIONAL AXES

RELATED APPLICATIONS

The present application is based on, and claims priority from, Japanese Application Number 2009-189818, filed Aug. 19, 2009, the disclosure of which is hereby incorporated by reference herein in its entirety.

BACKGROUND OF THE INVENTION

1. Field of the Invention

The present invention relates to an apparatus for displaying tool vectors of a tool in a machine tool with rotational axes and, more particularly, to a tool vector display apparatus used for a machine tool to display a line segment connecting between a tool center point and a point on the central axis of the tool at a certain distance away from the tool center point, as a tool vector, on a path of the tool center points.

2. Description of the Related Art

Some currently-used numerical controllers for controlling machine tools have a function to display a commanded path or a function to display a path on which the tool actually has moved. For example, Japanese Patent Application Laid-Open No. 7-72914 discloses a tool path display apparatus for CAD/CAM systems that displays a three-dimensional path of the tool center points and changes the color or width of lines according to the tool speed.

In a 5-axis machine tool, which includes rotational axes, the orientation of the tool changes in various directions during machining. A workpiece may be machined by the tool side rather than the tool end, so the relation between the machined surface and the motion of the tool cannot be sufficiently verified only from the tool end path.

Figure 1A:
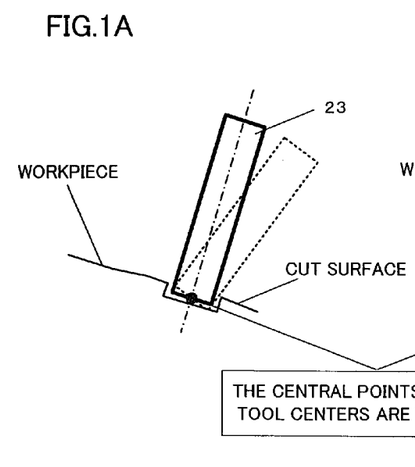
FIGS. 1A and 1B illustrate an effect of the inclination of a tool.
Figure 1B:
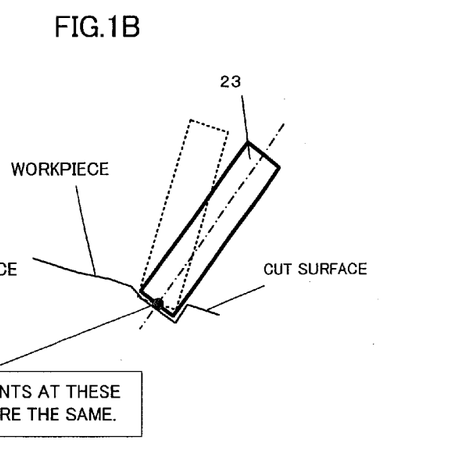
Figures 2A, 2B:
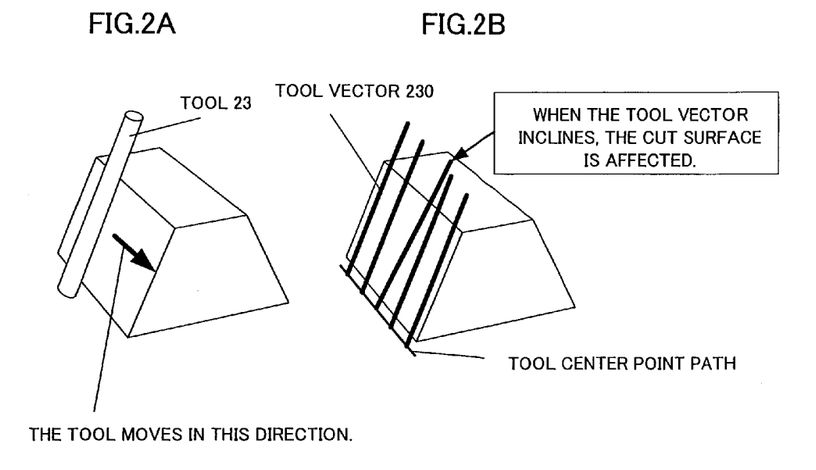
FIGS. 2A and 2B illustrate an effect of the inclination of a tool on a cut surface in case where a side of the tool is used for machining.

FIGS. 1A and 1B illustrate effects of the inclination of the tool. Even when the position of the tool center point of a tool 23 remains unchanged, the actual cut surface of the workpiece changes depending on the inclination of the tool 23, as clear from the comparison of FIG. 1A with FIG. 1B. FIGS. 2A and 2B illustrate that when the tool 23 inclines in machining by a side of the tool 23, the cut surface is affected. When a workpiece is machined by a side of the tool 23 as shown in FIG. 2A, the inclination of the tool 23 affects the cut surface. In FIG. 2B, the inclination of the tool 23 is represented by a tool vector and tool vectors are indicated along the path of tool center points to indicate that when a tool vector inclines, the cut surface of the workpiece is affected.

A technique for displaying tool vectors using data created by CAD or the like is disclosed in, for example, Japanese Patent Application Laid-Open No. 7-72914. However, this technique does not use actual feedback information, so comparison with machining failure points on a workpiece is not possible and thereby this technique is not useful for adjusting a 5-axis machine tool or finding the places of failures.

SUMMARY OF THE INVENTION

An object of the present invention is to provide a tool vector display apparatus for a machine tool that performs machining by driving a plurality of drive axes including at least one rotational axis to control the positions and orientations of a tool and workpiece, wherein the tool vector display apparatus is capable of displaying the orientation of the tool relative to the workpiece at points on a path of tool center points by using actual feedback information in a visually intuitive manner.

To achieve the above object, the tool vector display apparatus for a machine tool that performs machining by using a plurality of drive axes including at least one rotational axis to control the positions and orientations of a tool and workpiece comprises: a data acquiring unit that concurrently acquires actual positional information about the drive axes at different times; a tool path display unit that calculates three-dimensional coordinates, viewed from a coordinate system fixed to the workpiece, of a tool center point of the tool from the actual positional information and information about a mechanical structure of the machine tool, and displays a three-dimensional path of the tool center points by using the three-dimensional coordinates; and a tool vector display unit that calculates three-dimensional coordinates of a tool vector start point, which is a point away from the tool center point toward a root thereof by an amount of a preset distance, viewed from the coordinate system fixed to the workpiece, from the actual positional information and the information about the mechanical structure of the machine tool, and displays a line segment connecting between the tool vector start point and the tool center point, as a tool vector, on the three-dimensional path of the tool center points.

The line segment connecting between the tool vector start point and the tool center point may be displayed at intervals of a preset time.

A cylinder a radius of which is a diameter of the tool may displayed, centered around the line segment connecting between the tool vector start point and the end of the tool.

In a tool vector display apparatus for a machine tool that performs machining by driving a plurality of drive axes including at least one rotational axis to control the positions and orientations of a tool and workpiece, the present invention can provide a tool vector display apparatus that can display the orientation of the tool relative to a workpiece at points on a tool end path by using actual feedback information in a visually intuitive manner.

BRIEF DESCRIPTION OF THE DRAWINGS

The purposes and advantages of the present invention, including those described above, will be clarified by referring to the attached drawings in combination with the description of the embodiments described below. Of these drawings.

DETAILED DESCRIPTION OF THE PREFERRED EMBODIMENTS

Figure 3:
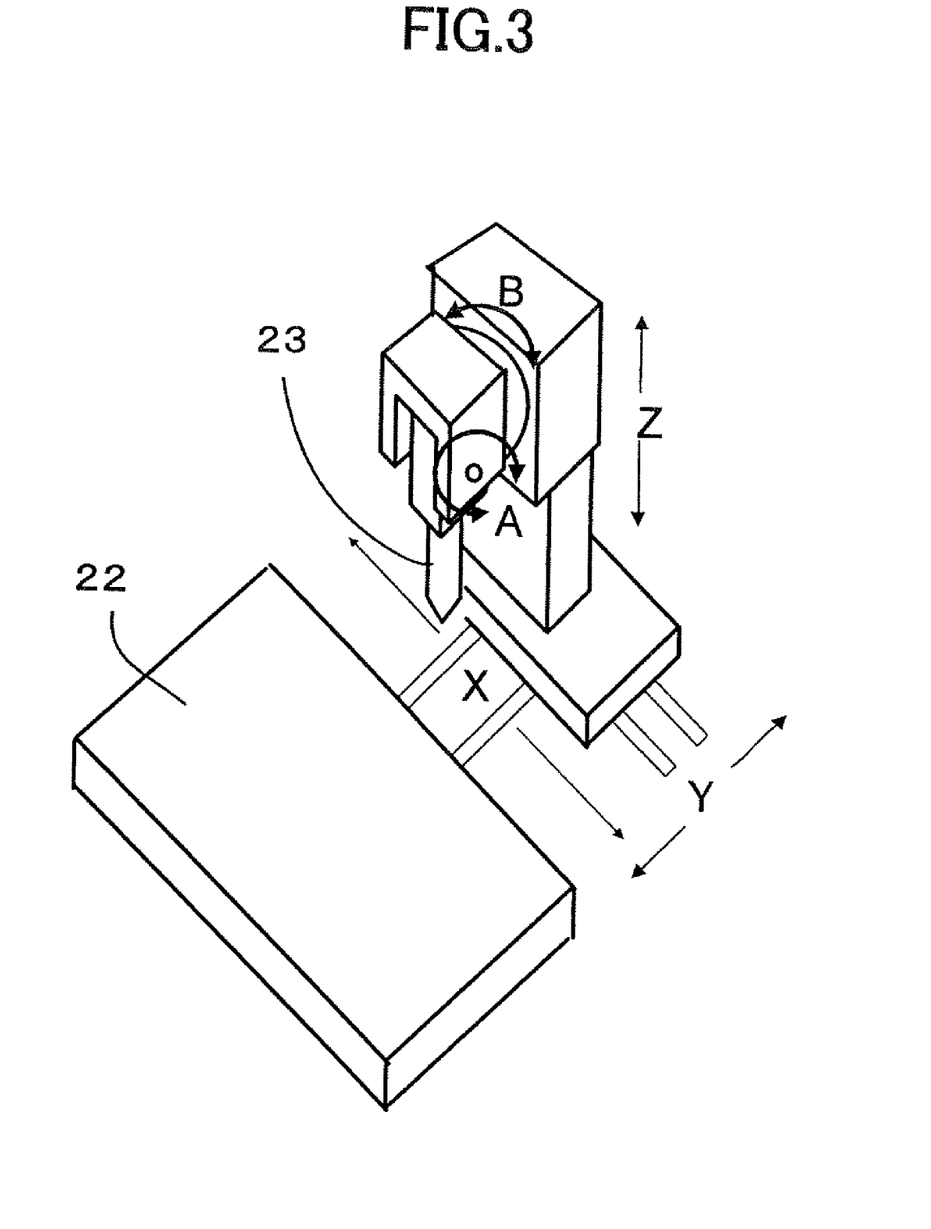
FIG. 3 is an external perspective view showing an example of a five-axis machine tool having a rotating tool head.

FIG. 3 is an external perspective view showing an example of a five-axis machine tool having a rotating tool head. The X, Y, and Z axes are linear axes, and the A and B axes are rotational axes. Coordinates of these five axes at time t are denoted x(t), y(t), z(t), a(t), and b(t), respectively. A workpiece (not shown) to be machined is placed on a table 22. The tool center point of a tool 23 is moved by the X, Y, and Z linear axes and the A and B rotational axes, relative to the workpiece.

If the intersection of axes around which the two rotational axes (A and B axes) of the five-axes machine tool, having a rotating tool head as the mechanical structure, rotate is denoted M, the coordinates of M are represented by (x(t), y(t), z(t)) in a coordinate system fixed to the workpiece in which the origin is appropriately set. If the length from the point M to the tool center point is denoted L, a point at which the tool faces right below is a reference point (or the origin) of the axis A and the axis B, then the coordinates (PosX (t), PosY(t), PosZ(t)) of a tool center point Pe are calculated according to the following equations.

$$PosX = x(t) + L \times \cos(a(t)) \times \sin(b(t))$$

$$PosY = y(t) + L \times \sin(a(t))$$

$$PosZ = z(t) - L \times \cos(a(t)) \times \cos(b(t)) \quad (1)$$

If a point on the central axis of the tool away from the tool center point Pe toward the point M by distance d is taken as a tool vector start point Ps, then the coordinates (PosX'(t), PosY'(t), PosX'(t)) of the tool vector start point Ps are calculated according to the following equations.

$$PosX' = x(t) + (L-d) \times \cos(a(t)) \times \sin(b(t))$$

$$PosY' = y(t) + (L-d) \times \sin(a(t))$$

$$PosZ' = z(t) - (L-d) \times \cos(a(t)) \times \cos(b(t)) \quad (2)$$

The tool length L, from the point M to the tool center point Pe, is stored in the numerical controller for the machine tool. As described above, the coordinates of the tool center point Pe and the tool vector start point Ps can be calculated according to the positional information of the five axes and the mechanical structure of the machine tool.

Next, a tool vector display apparatus for a machine tool in an embodiment of the present invention will be described.

Figure 4:
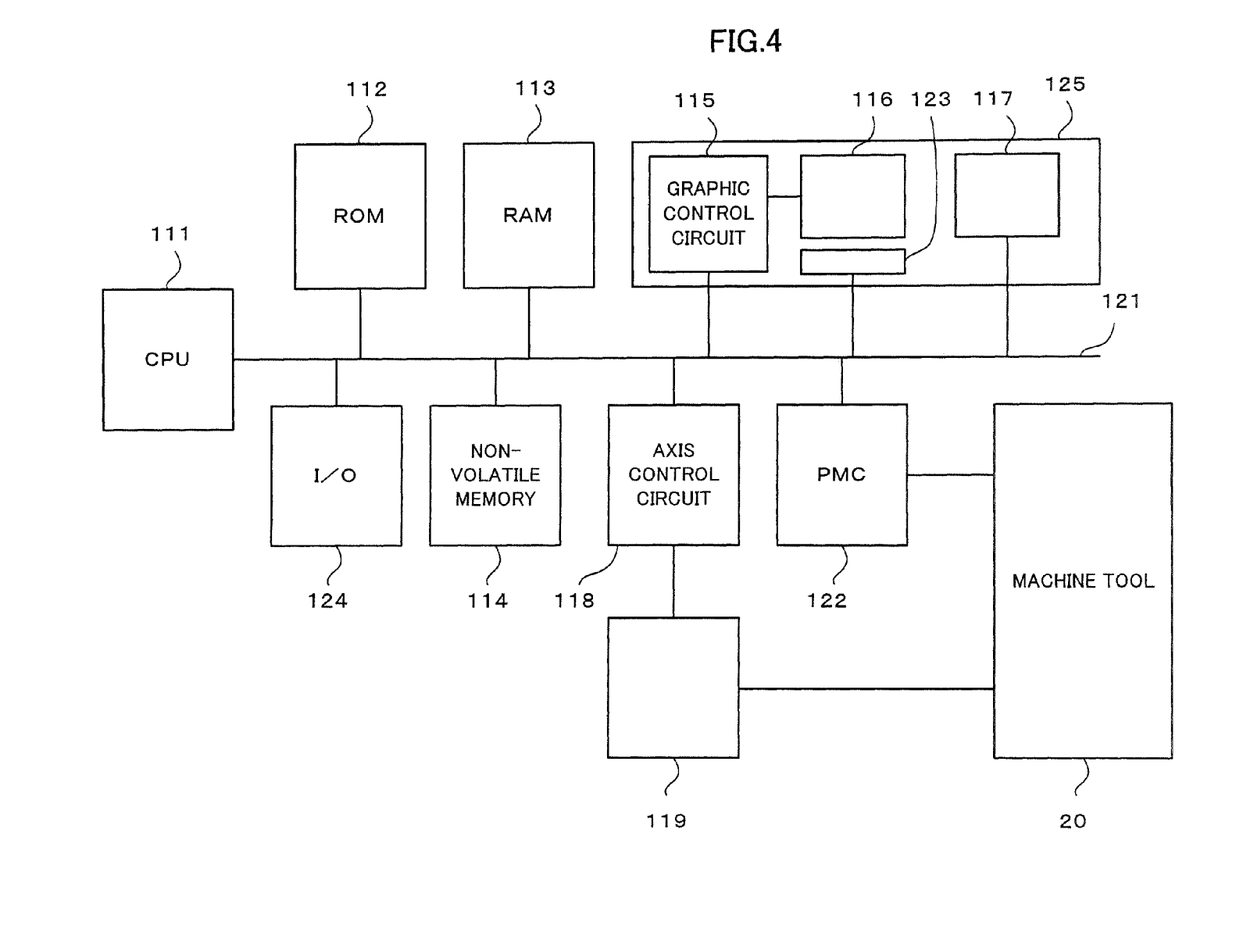
FIG. 4 is a block diagram that schematically shows the structure of a tool vector display apparatus in an embodiment of the present invention.

FIG. 4 is a block diagram that schematically shows the structure of a tool vector display apparatus in the embodiment of the present invention.

A CPU 111, which is a processor, controls a numerical controller 10 entirely according to a system program stored in a ROM 112. A RAM 113 stores various types of data or input/output signals. Data stored in a non-volatile memory 114 is not erased even when power is turned off.

A graphic control circuit 115 converts digital signals into signals used for display purposes and sends the converted signals to a display unit 116. A keyboard 117 has numeric keys and character keys used to enter various settings.

An axis control circuit 118 receives axis moving commands from the CPU 111 and outputs them to a servo amplifier 119. Upon receipt of these moving commands, the servo amplifier 119 drives servo motors (not shown) of a machine tool 20. These constituents are mutually connected through a bus 121.

A programmable machine controller (PMC) 122 receives a T-function signal (tool selection signal) or the like through the bus 121 when a machining program is executed. The PMC processes the signal by using a sequence program and outputs a signal as an operation command to control the machine tool 20. The PMC also receives a status signal from the machine tool 20 and transfers a necessary input signal to the CPU 111.

Also connected to the bus 121 are a software keyboard 123 of which functions change according to the system program or the like and an interface 124 through which NC data is sent to external devices such as a storage device. The software keyboard 123 is disposed on the display unit/MDI (manual data input) panel 125 together with the display unit 116 and keyboard 117.

Figure 5:
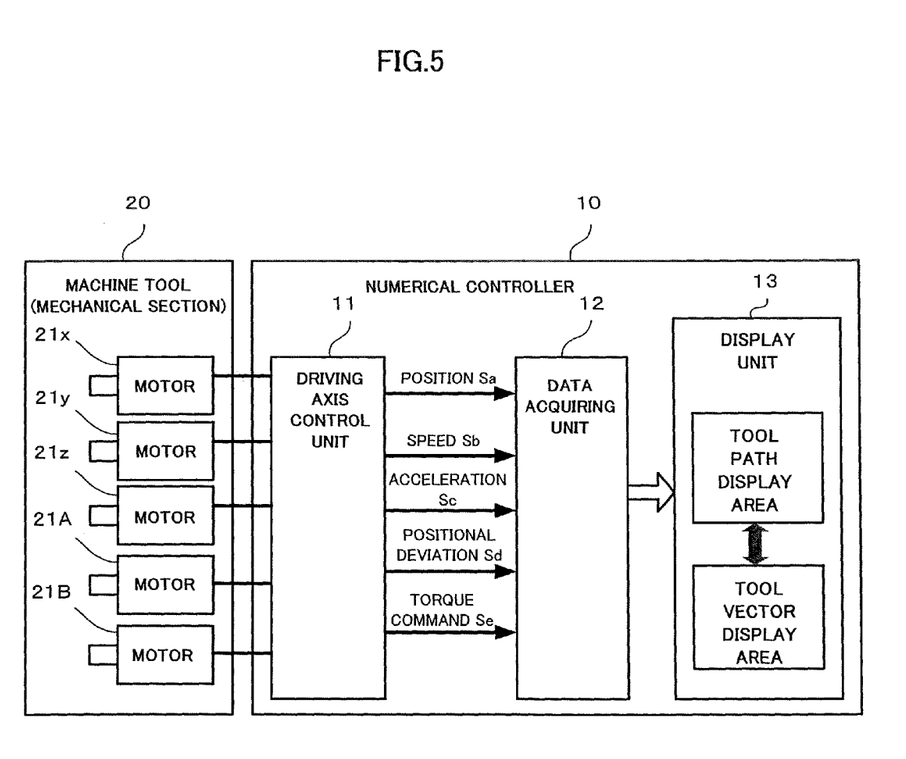
FIG. 5 is a block diagram of the main units of a tool vector display apparatus in a first embodiment of the present invention.

FIG. 5 is a block diagram of the main units of a tool vector display apparatus in a first embodiment of the present invention. In this embodiment, the tool vector display apparatus is incorporated in the numerical controller 10 for a machine tool. The numerical controller 10 has a driving axis control unit 11, a data acquiring unit 12, and a display unit 13.

The machine tool 20 has servo motors $21x$, $21y$, $21z$, 21A, and 21B that drive feed axes. Servo amplifiers (not shown) are controlled by torque commands from a driving axis control unit 11 in the numerical controller 10, and the servo motors $21x$, $21y$, $21z$, 21A, and 21B are driven by the servo amplifiers. The servo motors $21x$, $21y$, $21z$, 21A, and 21B each has a position/speed detector (not shown), which sends positional information and speed information about the relevant servo motor to the driving axis control unit 11.

The driving axis control unit 11 sends positional information Sa, speed information Sb, acceleration information Sc, position deviation information Sd, and a torque command Se to the data acquiring unit 12. The data acquiring unit 12 concurrently acquires these information items from the driving axis control unit 11 at intervals of a fixed time. The acquired information is stored in a memory (not shown). The display unit 13 displays a three-dimensional movement path of the tool center points in a tool path display area, and also displays tool vectors in the tool vector display area in time series.

Figure 6:
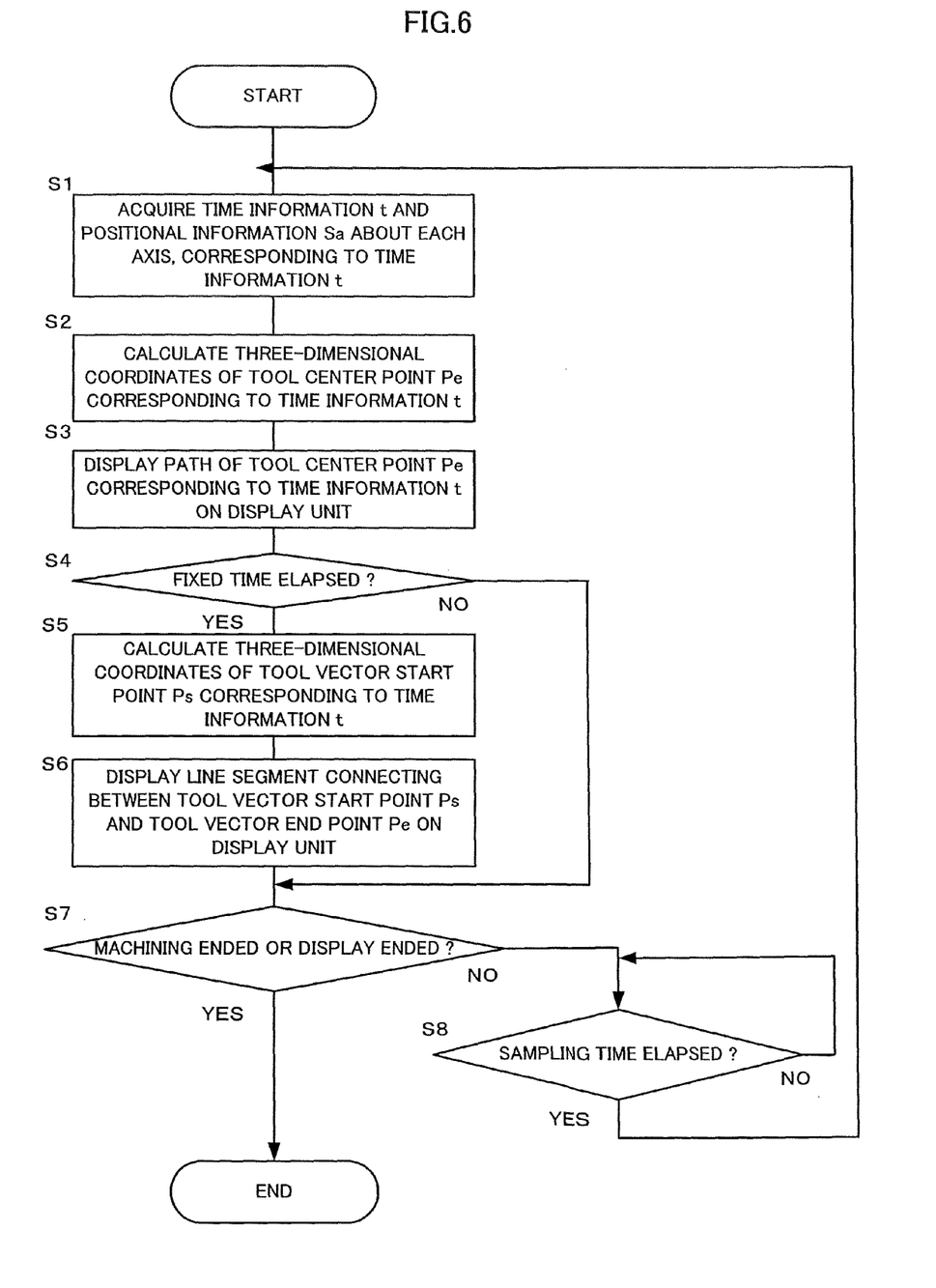
FIG. 6 is a flowchart illustrating an algorithm to display a tool vector in the present invention.

FIG. 6 is a flowchart illustrating an algorithm to display a tool vector 230 in the present invention. The steps in the flowchart will be sequentially described below.

[Step S1] Time information t and positional information about each axis, corresponding to the time information t, are acquired.

[Step S2] The three-dimensional coordinates of the tool center point Pe corresponding to the time information t obtained in step S1 are calculated.

[Step S3] The path of the tool center point Pe is calculated from its three-dimensional coordinates obtained in step S2 and displayed on the display unit.

[Step S4] Whether a 'predetermined time' has elapsed or not is decided. If the predetermined time has elapsed, the sequence proceeds to step S5. If not, the sequence proceeds to step S7.

At this step, whether a predetermined time has elapsed or not is decided because tool vectors 230 are displayed at intervals of a fixed time in the case of the present invention (see FIGS. 2A and 7), although the path of the tool center points Pe is displayed as a line segment formed by consecutive tool center points on the screen of the display unit. Whether the fixed time has passed or not can be decided by using a timer function included in the numerical controller. The time function is reset each time the processing for displaying tool vectors is terminated. It is known that a numerical controller has such a timer function.

[Step S5] The coordinates of the tool vector start point Ps corresponding to the time information t are calculated according to a calculating formula that corresponds to the mechanical structure of the machine tool.

[Step S6] A line segment connecting between the tool vector start point Ps and the tool center point Pe, which is the end point of the tool vector, is displayed on the display unit.

[Step S7] It is determined whether or not the workpiece has been machined by the machine tool or whether or not there is a signal indicating that the display processing has been completed. If the workpiece has been machined or there is a display end signal (the result is YES), the display processing is terminated. If the workpiece has not been completed and there is no display end signal (the result is NO), on the other hand, the sequence proceeds to step S8.

[Step S8] Waiting until a sampling time for displaying the path of the tool center points Pe on the display unit has elapsed, the sequence returns to step S1 and the display processing is continued. The sampling time is shorter than the 'predetermined time' used for the decision in step S4. In this step as well, a timer function can be used to confirm that the sampling time has elapsed.

Figure 7:
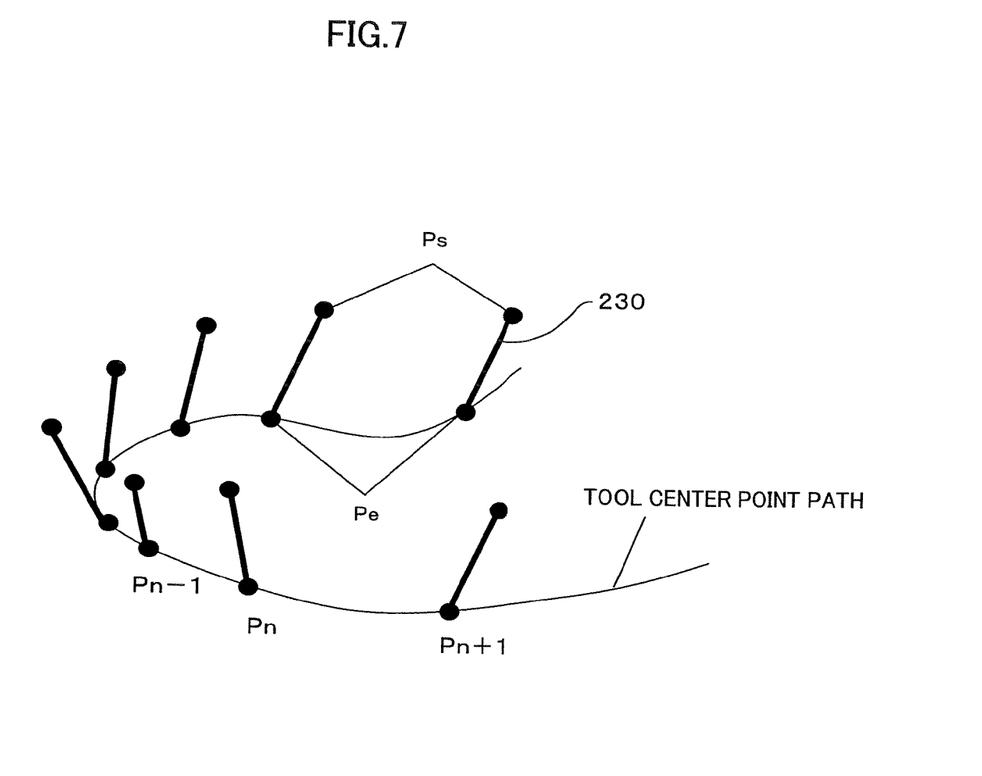
FIG. 7 shows tool vectors displayed in the tool vector display area on the display unit of the numerical controller shown in FIG. 5.

When the processing in the flowchart shown in FIG. 6 is carried out on the numerical controller 10 (the tool vector display apparatus in the first embodiment of the present invention), tool vectors 230 can be displayed in the tool vector display area on the display unit 13, as shown in FIGS. 2B and 7.

The present invention can display, in the tool vector display area on the display unit 13, tool vectors with lengths that enable their behavior to be visually recognized with ease. If, for example, long tool vectors were displayed and oriented in various directions, the roots of respective tools 23 displayed would intersect with each other, thereby lowering visibility thereof. However, such problem can be prevented by the present invention. The workpiece shape defined in the machining program may be displayed as shown in FIG. 2B.

FIG. 7 shows tool vectors displayed in the tool vector display area on the display unit 13 of the numerical controller 10 shown in FIG. 5.

First, points are plotted at intervals of a fixed time on the path of the tool center points to be displayed in the vector display area on the display unit 13. The tool vector start point Ps corresponding to each point is then obtained, and a line segment connecting between the obtained tool vector start point Ps and its corresponding tool center point Pe, which is the end point of the tool vector, is drawn. The resulting tool vectors 230 shown in FIG. 7 enable the orientation of the tool at each tool center point Pe to be grasped at a glance. In addition, the distance between each two line segments which represent tool vectors enables the tool movement speed to be visually grasped with ease. The width and color of the displayed line segments may be appropriately selected; for example, a line segment displayed as a tool vector may be displayed as a cylinder the radius of which is the diameter of the tool.

Figure 8:
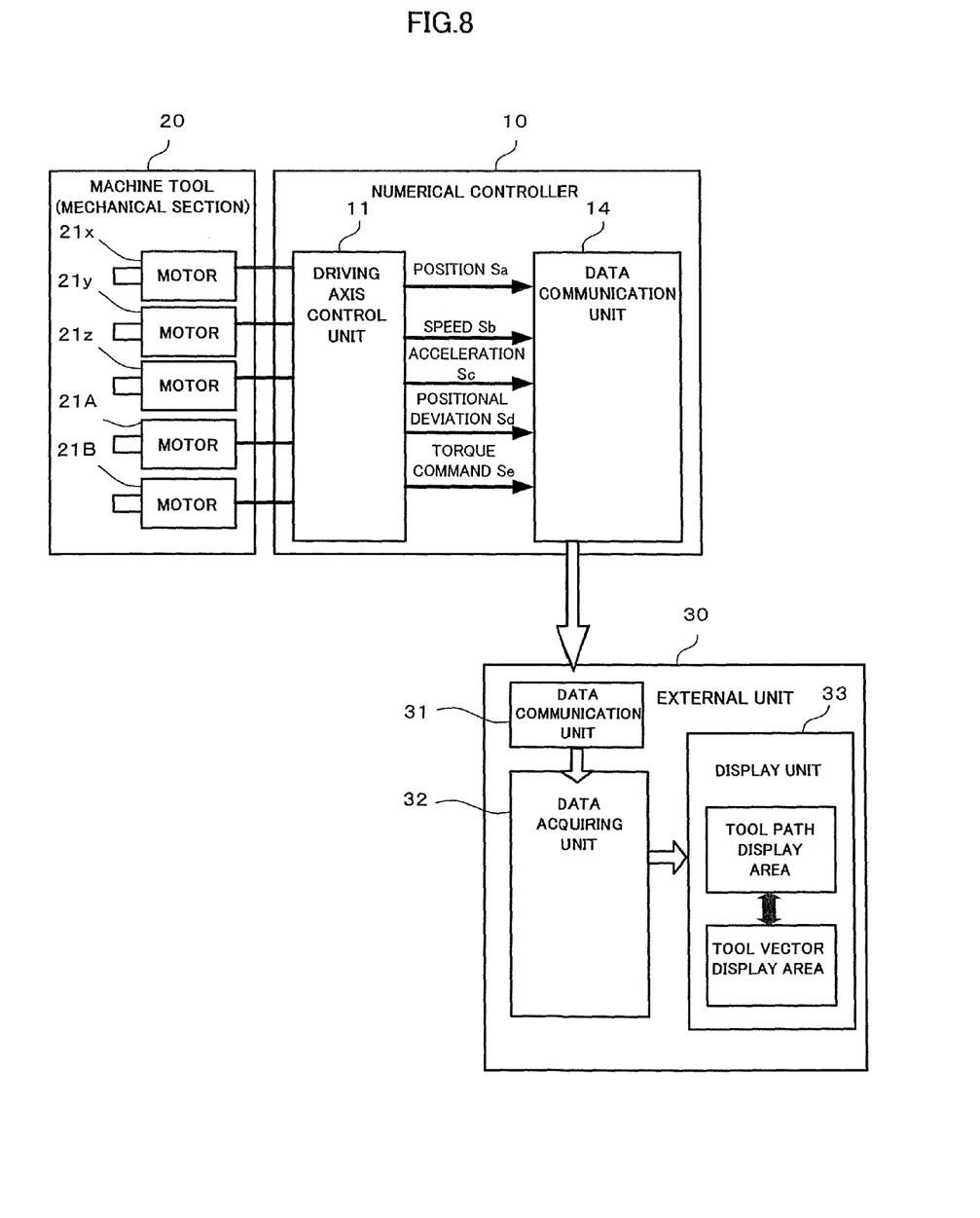
FIG. 8 is a block diagram of the main units of a tool vector display apparatus in a second embodiment of the present invention.

FIG. 8 is a block diagram of the main units of a tool vector display apparatus in a second embodiment of the present invention. In this embodiment, the tool vector display apparatus is disposed in an external unit 30 rather than the numerical controller 10 for a machine tool. The numerical controller includes a data communication unit 14 in addition to the driving axis control unit 11. The external unit 30 includes a data communication unit 31, a data acquiring unit 32, and a display unit 33. A tool vector display area on the display unit 33 displays tool vectors in time series, as in the first embodiment described above.

Figure 9:
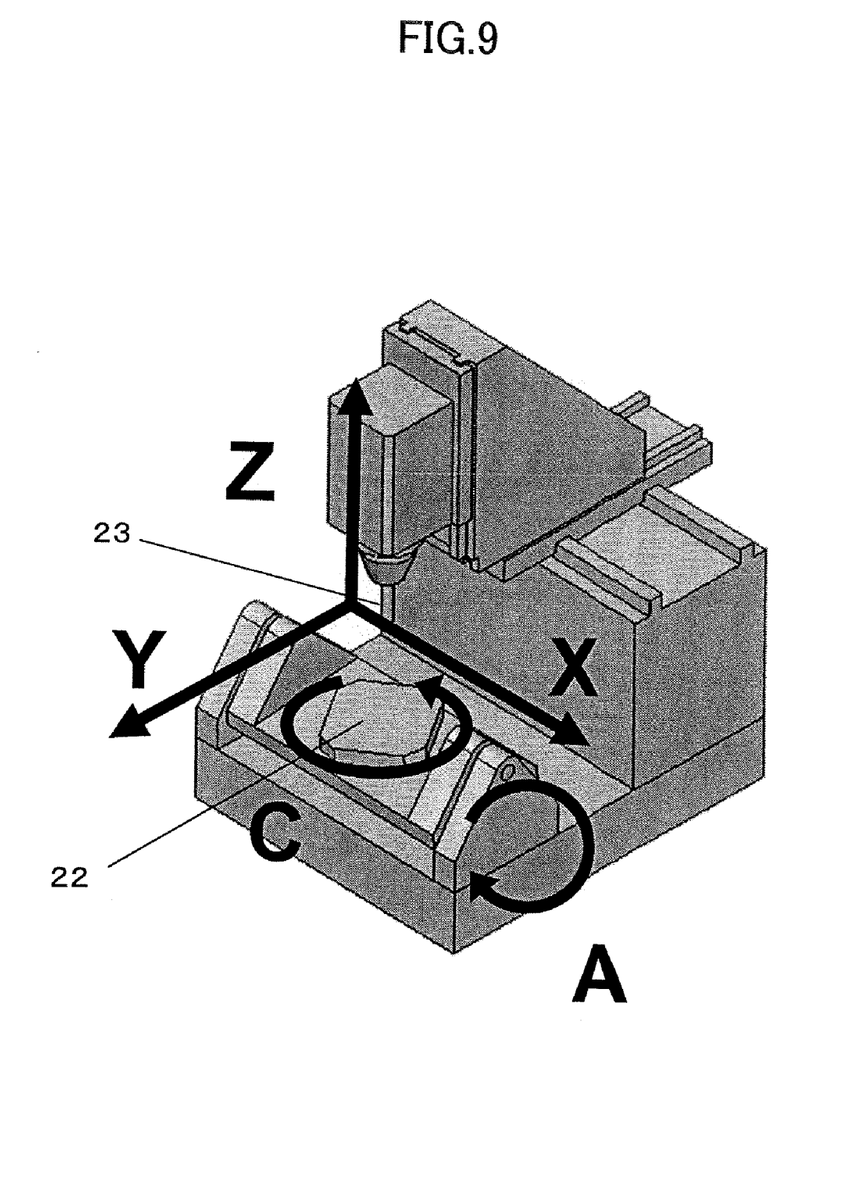
FIG. 9 is an external perspective view showing an example of a five-axis machine tool having a rotating table.

The machine tool to which the tool vector display apparatus in the first or second embodiment described above is applied is a five-axis machine tool with a rotating tool head, as shown in FIG. 3. Five-axis machine tools include those with a rotating table, as shown in FIG. 9. As for the five-axis machine tool with a rotating table shown in FIG. 9, the X, Y, and Z axes are linear axes and the A and C axes are rotating axes. The angle of the table 22 on which a workpiece is placed is changed by the A and C axes. The central axis around which the A axis rotates is orthogonal to the central axis around which the C axis rotates, and the intersection between these central axes is denoted M.

Now, two coordinate systems will be considered. A first coordinate system is fixed in a space, with its origin being a point M, and a second coordinate system is fixed to the table 22 with its origin also being the point M. The point M remains at the same position even when the A and C axes rotate, so the origin of the first coordinate system always matches the origin of the second coordinate system. If the coordinates of the A and C axes at time t are respectively denoted a(t) and c(t), when a(t) is 0 and c(t) is also 0, the first coordinate and the second coordinate mutually match.

If the coordinates of the tool center point at time t in coordinate system 1 fixed to the space are denoted (x(t), y(t), z(t)), then the coordinates (PosX(t), PosY(t), PosZ(t)) of the tool center point Pe in coordinate system 2 can be calculated according to the following equations.

$$PosX = x(t) \times \cos(c(t)) - y(t) \times \cos(a(t)) \times \sin(c(t)) - z(t) \times \sin(a(t)) \times \sin(c(t))$$

$$PosY = x(t) \times \sin(c(t)) + y(t) \times \cos(a(t)) \times \cos(c(t)) + z(t) \times \sin(a(t)) \times \cos(c(t))$$

$$PosZ = -y(t) \times \sin(a(t)) + z(t) \times \cos(a(t)) \quad (3)$$

If a point on the central axis of the tool away from the tool center point Pe toward the root of the tool by d is taken as the tool vector start point Ps, then the coordinates (PosX'(t), PosY'(t), PosX'(t)) are calculated according to the following equations.

$$PosX' = x(t) \times \cos(c(t)) - y(t) \times \cos(a(t)) \times \sin(c(t)) - (z(t) + d) \times \sin(a(t)) \times \sin(c(t))$$

$$PosY' = x(t) \times \sin(c(t)) + y(t) \times \cos(a(t)) \times \cos(c(t)) + (z(t) + d) \times \sin(a(t)) \times \cos(c(t))$$

$$PosZ' = -y(t) \times \sin(a(t)) + z(t) \times \cos(a(t)) \quad (4)$$

As described above, the present invention can display tool vectors on the display unit by calculating the coordinates of their start points and end points in the same way as for the five-axis machine tool with a rotating tool head.

The invention claimed is:

1. A tool vector display apparatus for a machine tool that performs machining by using a plurality of drive axes including at least one rotational axis to control positions and orientations of a tool and a workpiece, the apparatus comprising:
   a data acquiring unit that concurrently acquires actual positional information about the drive axes at different times, detected by detectors mounted on the drive axes;
   a tool path display unit that calculates three-dimensional coordinates, viewed from a coordinate system fixed to the workpiece, of a tool center point of the tool from the actual positional information and information about a mechanical structure of the machine tool, and displays a three-dimensional path of the tool center points by using the three-dimensional coordinates; and
   a tool vector display unit that calculates three-dimensional coordinates of a tool vector start point, which is a point away from the tool center point toward a root thereof by an amount of a preset distance, viewed from the coordinate system fixed to the workpiece, from the actual positional information and the information about the mechanical structure of the machine tool, and displays a line segment connecting between the tool vector start point and the tool center point, as a tool vector, on the three-dimensional path of the tool center points.

2. The tool vector display apparatus according to claim 1, wherein the line segment connecting between the tool vector start point and the tool center point is displayed at intervals of a preset time.

3. The tool vector display apparatus according to claim 2, wherein a cylinder a radius of which is a diameter of the tool is displayed, centered around the line segment connecting between the tool vector start point and the end of the tool.

4. The tool vector display apparatus according to claim 1, wherein a cylinder a radius of which is a diameter of the tool is displayed, centered around the line segment connecting between the tool vector start point and the end of the tool.

5. The tool vector display apparatus according to claim 1, wherein, if the machine tool is a five-axis machine tool having a rotational tool head comprising X, Y and Z axes which are linear axes and A and B axes which are rotational axes, three-dimensional coordinates of the tool center point (PosX(t), PosY(t), PosZ(t)) is calculated by the following equations;

$$PosX = x(t) + L \times \cos(a(t)) \times \sin(b(t))$$

$$PosY = y(t) + L \times \sin(a(t))$$

$$PosZ = z(t) - L \times \cos(a(t)) \times \cos(b(t))$$

and three-dimensional coordinates of the tool vector start point (PosX'(t), PosY'(t), PosZ'(t)) is calculated by the following equations;

$$PosX' = x(t) + (L-d) \times \cos(a(t)) \times \sin(b(t))$$

$$PosY' = y(t) + (L-d) \times \sin(a(t))$$

$$PosZ' = z(t) - (L-d) \times \cos(a(t)) \times \cos(b(t)),$$

where x(t), y(t) and z(t) are X-, Y- and Z-axis coordinate values of intersections of two central axes around which each of the two rotational axes (A axis and B axis) rotate, at time t, and a(t) and b(t) are A- and B-axis coordinate values at time t, L is a tool length, and d is a preset distance.

6. The tool vector display apparatus according to claim 1, wherein, if the machine tool is a five-axis machine tool having a rotating table comprising X, Y and Z axes which are linear axes and A and C axes which are rotational axes, three-dimensional coordinates of the tool center point (PosX(t), PosY(t), PosZ(t)) is calculated by the following equations;

$$PosX = x(t) \times \cos(c(t)) - y(t) \times \cos(a(t)) \times \sin(c(t)) - z(t) \times \sin(a(t)) \times \sin(c(t))$$

$$PosY = x(t) \times \sin(c(t)) + y(t) \times \cos(a(t)) \times \cos(c(t)) + z(t) \times \sin(a(t)) \times \cos(c(t))$$

$$PosZ = -y(t) \times \sin(a(t)) + z(t) \times \cos(a(t))$$

and three-dimensional coordinates of the tool vector start point (PosX'(t), PosY'(t), PosZ'(t)) is calculated by the following equations;

$$PosX' = x(t) \times \cos(c(t)) - y(t) \times \cos(a(t)) \times \sin(c(t)) - (z(t)+d) \times \sin(a(t)) \times \sin(c(t))$$

$$PosY' = x(t) \times \sin(c(t)) + y(t) \times \cos(a(t)) \times \cos(c(t)) + (z(t)+d) \times \sin(a(t)) \times \cos(c(t))$$

$$PosZ' = -y(t) \times \sin(a(t)) + z(t) \times \cos(a(t)),$$

where x(t), y(t) and z(t) are X-, Y- and Z-axis coordinate values of the tool center point at time t in coordinate system fixed to a space, and a(t) and c(t) are A- and C-axis coordinate values at time t, L is a tool length, and d is a preset distance.

* * * * *